(12) United States Patent　　(10) Patent No.: 　US 8,892,491 B2
Wang et al.　　(45) Date of Patent: 　Nov. 18, 2014

(54) SUBSTRUCTURE AND BOUNDARY MODELING FOR CONTINUOUS ACTION RECOGNITION

(75) Inventors: Jinjun Wang, San Jose, CA (US); Zhaowen Wang, Urbana, IL (US); Jing Xiao, Cupertino, CA (US)

(73) Assignee: Seiko Epson Corporation, Tokyo (JP)

( * ) Notice: Subject to any disclaimer, the term of this patent is extended or adjusted under 35 U.S.C. 154(b) by 232 days.

(21) Appl. No.: 13/491,108

(22) Filed: Jun. 7, 2012

(65) Prior Publication Data

US 2013/0132316 A1　May 23, 2013

Related U.S. Application Data

(60) Provisional application No. 61/562,115, filed on Nov. 21, 2011.

(51) Int. Cl.
　　*G06N 5/02*　　(2006.01)
　　*G06T 7/20*　　(2006.01)
　　*G06N 99/00*　　(2010.01)

(52) U.S. Cl.
　　CPC .................................... *G06N 99/005* (2013.01)
　　USPC ............................................. 706/46; 382/159

(58) Field of Classification Search
　　None
　　See application file for complete search history.

(56) References Cited

U.S. PATENT DOCUMENTS

| | | | |
|---|---|---|---|
| 6,993,462 B1 | 1/2006 | Pavlovic et al. | |
| 6,999,601 B2 | 2/2006 | Pavlovic et al. | |
| 7,728,839 B2 * | 6/2010 | Yang et al. | ..................... 345/474 |
| 2011/0033122 A1 | 2/2011 | Le Roux et al. | |
| 2011/0116711 A1 | 5/2011 | Wang et al. | |

OTHER PUBLICATIONS

Morency, L. et al. "Latent-dynamic discriminative models for continuous gesture recognition." Computer Vision and Pattern Recognition, 2007. CVPR'07. IEEE Conference on. IEEE, 2007.*
Oh, S. et al. "Learning and inference in parametric switching linear dynamic systems." Computer Vision, 2005. ICCV 2005. Tenth IEEE International Conference on. vol. 2. IEEE, 2005.*
Rosti, A. et al. "Rao-blackwellised Gibbs sampling for switching linear dynamical systems." Acoustics, Speech, and Signal Processing, 2004. Proceedings.(ICASSP'04). IEEE International Conference on. vol. 1. IEEE, 2004.*
Doucet, A., et al., "Rao-Blackwellised Particle Filtering for Dynamic Bayesian Networks", Proceedings of the 16th Conference on Uncertainty in Artificial Intelligence, pp. 176-183, 2000.
Ozay, N., et al., "Sequential Sparsification for Change Detection", Proceedings of Computer Vision and Pattern Recognition (CVPR '08) pp. 1-6, 2008.
Raptis, M., et al., "Spike Train Driven Dynamical Models for Human Actions", Proceedings of Computer Vision and Pattern Recognition (CVPR '10), pp. 2077-2084, 2010.

(Continued)

*Primary Examiner* — Kakali Chaki
*Assistant Examiner* — Eric Nilsson

(57) ABSTRACT

Embodiments of the present invention include systems and methods for improved state space modeling (SSM) comprising two added layers to model the substructure transition dynamics and action duration distribution. In embodiments, the first layer represents a substructure transition model that encodes the sparse and global temporal transition probability. In embodiments, the second layer models the action boundary characteristics by injecting discriminative information into a logistic duration model such that transition boundaries between successive actions can be located more accurately; thus, the second layer exploits discriminative information to discover action boundaries adaptively.

14 Claims, 10 Drawing Sheets

SLDS with Substructure Transition Model and Discriminative Boundary Model

(56) References Cited

OTHER PUBLICATIONS

Morency, L.P., et al., "Latent-Dynamic Discriminative Models for Continuous Gesture Recognition" Computer Vision and Pattern Recognition, 2007. CVPR '07. IEEE Conference on Jun. 17-22, 2007.

Shen, Y., et al., "Sparse Hidden-Dynamics Conditional Random Fields for User Intent Understanding", Proceedings of the 20th international conference on world wide web, pp. 7-16, ACM New York, NY, Mar. 2011.

Ramirez, G., et al., "Modeling Latent Discriminative Dynamic of Multi-Dimensional Affective Signals", Proceeding ACII'11 Proceedings of the 4th international conference on Affective computing and intelligent interaction, vol. Part II, pp. 396-406, 2011.

Mohammad, Y., et al., "Incremental Gesture Discovery for Interactive Robots", Robotics and Biomimetics (ROBIO), 2010 IEEE International Conference, pp. 185-189, Dec. 14-18, 2010.

Yang, R., et al., "Coupled grouping and matching for sign and gesture recognition", Computer Vision and Image Understanding, Elsevier, Sep. 2008.

Yu, S., "Hidden Semi-Markov Models", Artificial Intelligence, vol. 174, Issue 2, pp. 215-243, Feb. 2010.

Sang, M., et al."Learning and Inference in parametric switching linear dynamic systems", Proceedings of ICCV, 2005.

McCallum, A., et al., "Maximum Entropy Markov Models for Information Extraction and Segmentation", ICML 2000.

Lafferty, J., et al., "Conditional Random Fields: Probabilistic Models for Segmenting and Labeling Sequence Data", ICML, 2001.

Maragakis, P., et al., "Bayesian Estimates for Free Energies from Nonequilibrium Work Data in the Presence of Instrument Noise", Journal of Chemical Physics, 129, 024102, 2008.

\* cited by examiner

SLDS with Substructure Transition Model and Discriminative Boundary Model

Switching LDS (SLDS) Graphical Model (Prior Art)

SUBSTRUCTURE AND BOUNDARY MODELING FOR CONTINUOUS ACTION RECOGNITION

CROSS-REFERENCE TO RELATED APPLICATIONS

This application claims the priority benefit under 35 USC §119(e) to commonly assigned U.S. Patent Application No. 61/562,115, filed on Nov. 21, 2011, entitled "SUBSTRUCTURE AND BOUNDARY MODELING FOR CONTINUOUS ACTION RECOGNITION," and listing as inventors Jinjun Wang, Zhaowen Wang, and Jing Xiao. The aforementioned patent document is incorporated by reference herein in its entirety.

This application is related to U.S. patent application Ser. No. 13/405,986, filed on Feb. 27, 2012, entitled "EMBEDDED OPTICAL FLOW FEATURES," and listing as inventors Jinjun Wang and Jing Xiao, which claims priority to U.S. Provisional Patent Application No. 61/447,502, filed on Feb. 28, 2011, entitled "SIMULTANEOUSLY SEGMENTATION AND RECOGNITION OF CONTINUOUS ACTION PRIMITIVES," and listing as inventors Jinjun Wang and Jing Xiao. Each of the aforementioned patent documents is incorporated by reference herein in its entirety.

TECHNICAL FIELD

The present patent document is directed towards systems and methods for segmenting and recognizing of actions.

DESCRIPTION OF THE RELATED ART

Vision-based action recognition has wide application. For example, vision-based action recognition may be used in driving safety, security, signage, home care, robot training, and other applications.

One important application of vision-based action recognition is Programming-by-Demonstration (PbD) for robot training. For Programming-by-Demonstration, a task to train is often decomposed into primitive action units. For example, in Programming-by-Demonstration, a human demonstrates a task that is desired to be repeated by a robot. While the human demonstrates the task, the demonstration process is captured by sensors, such as a video or videos using one or more cameras. These videos are segmented into individual unit actions, and the action type is recognized for each segment. The recognized actions are then translated into robotic operations for robot training.

Understanding continuous activities from videos using, for example, simultaneous segmentation and classification of actions, is a fundamental yet challenging problem in computer vision. Many existing works approach the problem using bottom-up methods, where segmentation is performed as preprocessing to partition videos into coherent constituent parts, and action recognition is then applied as an isolated classification step. Although literature exists for segmentation of time series, such as change point detection, periodicity of cyclic events modeling, and frame clustering, the methods tend to detect local boundaries and lack the ability to incorporate global dynamics of temporal events, which leads to under or over segmentation that severely affects the recognition performance, especially for complex actions with diversified local motion statistics.

The limitation of the bottom-up approaches has been addressed by performing concurrent top-down recognition using variants of Dynamic Bayesian Network (DBN), where the dynamics of temporal events are modeled as transitions in a latent or partially observed state space. The technique has been used in speech recognition and natural language processing, while the performance of existing DBN-based approaches for action recognition tends to be relatively lower, mostly due to the difficulty in interpreting the physical meaning of latent states. Thus, it becomes difficult to impose additional prior knowledge with clear physical meaning into an existing graphical structure to further improve its performance.

Accordingly, what is needed are improved systems and methods for segmentation and classification of actions.

BRIEF DESCRIPTION OF THE DRAWINGS

Reference will be made to embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments.

DETAILED DESCRIPTION OF THE PREFERRED EMBODIMENTS

Figure 1B:
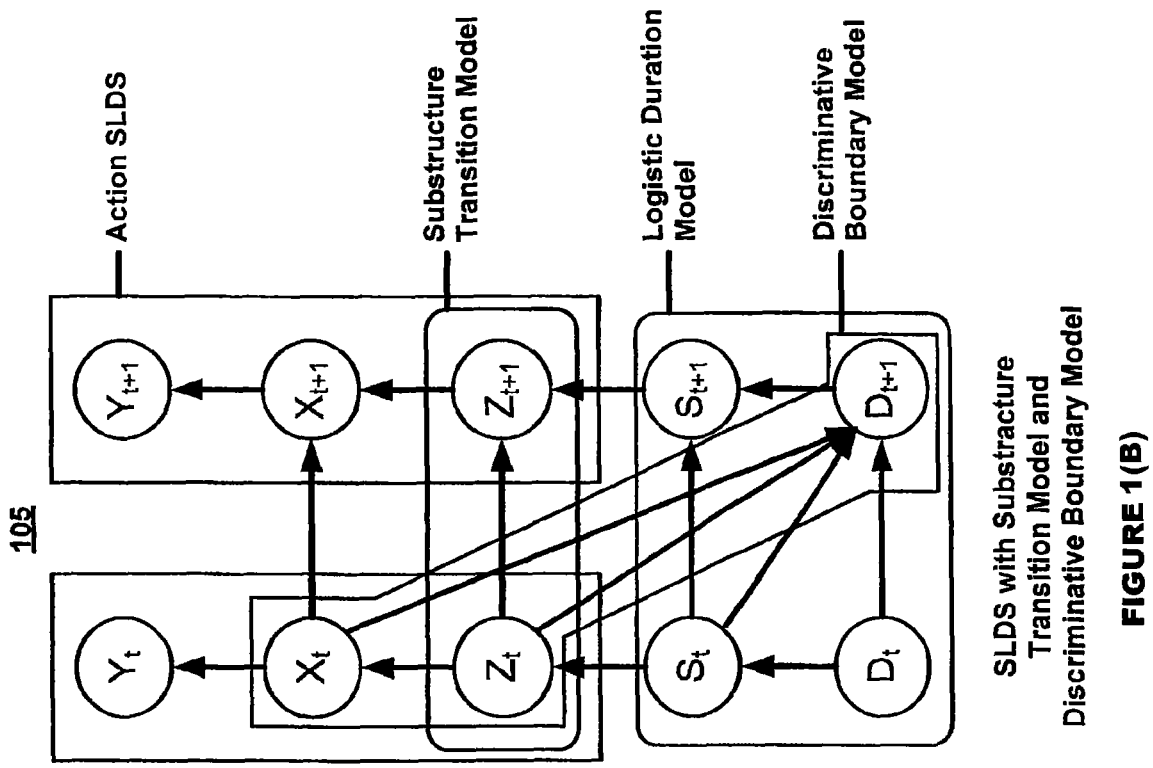
FIG. 1(b) depicts a graphical representation of a model for continuation action recognition, according to embodiments of the present invention, in which each action is represented by an SLDS with substructure transition and the inter action transition is controlled by discriminative boundary modeling.

In the following description, for purposes of explanation, specific details are set forth in order to provide an understanding of the invention. It will be apparent, however, to one skilled in the art that the invention can be practiced without these details. Furthermore, one skilled in the art will recognize that embodiments of the present invention, described below, may be implemented in a variety of ways, such as a process, an apparatus, a system, a device, or a method on a tangible computer-readable medium.

Also, it shall be noted that steps or operations may be performed in different orders or concurrently, as will be apparent to one of skill in the art. And, in instances, well known process operations have not been described in detail to avoid unnecessarily obscuring the present invention.

Components, or modules, shown in diagrams are illustrative of exemplary embodiments of the invention and are meant to avoid obscuring the invention. It shall also be understood that throughout this discussion that components may be described as separate functional units, which may comprise sub-units, but those skilled in the art will recognize that various components, or portions thereof, may be divided into separate components or may be integrated together, including integrated within a single system or component. It should be noted that functions or operations discussed herein may be implemented as components or modules. Components or modules may be implemented in software, hardware, or a combination thereof.

Furthermore, connections between components within the figures are not intended to be limited to direct connections. Rather, data between these components may be modified, re-formatted, or otherwise changed by intermediary components. Also, additional or fewer connections may be used. It shall also be noted that the terms "coupled" or "communicatively coupled" shall be understood to include direct connections, indirect connections through one or more intermediary devices, and wireless connections.

Reference in the specification to "one embodiment," "preferred embodiment," "an embodiment," or "embodiments" means that a particular feature, structure, characteristic, or function described in connection with the embodiment is included in at least one embodiment of the invention and may be in more than one embodiment. The appearances of the phrases "in one embodiment," "in an embodiment," or "in embodiments" in various places in the specification are not necessarily all referring to the same embodiment or embodiments.

The use of certain terms in various places in the specification is for illustration and should not be construed as limiting. A service, function, or resource is not limited to a single service, function, or resource; usage of these terms may refer to a grouping of related services, functions, or resources, which may be distributed or aggregated.

Embodiments of the present invention presented herein will be described using video data and human action examples. These examples are provided by way of illustration and not by way of limitation. One skilled in the art shall also recognize the general applicability of the present inventions to other applications.

A. General Overview

Figure 1A:
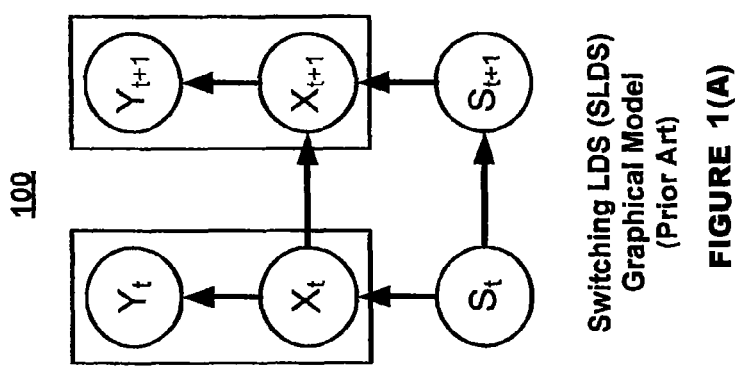
FIG. 1(a) depicts a traditional Switching Linear Dynamic System (SLDS) graphical model for continuous action recognition, where each action is represented by an LDS.

Due to the ineffectual results of prior approaches, the present patent document presents how at least two additional sources of information with clear physical interpretations can be considered in a general graphical structure for State-Space Model (SSM). Compared to a standard Switching Linear Dynamic System (SLDS) 100, shown in FIG. 1(a), where X, Y, and S are respectively the hidden state, the observation, and the label, the new model 105 in FIG. 1(b) is augmented with two additional components or nodes, Z and D, to consider the substructure transition and duration statistics of actions. FIG. 1(b) depicts an embodiment of the structure of model 105 according to embodiments of the present invention, in which an action is represented by an SLDS with substructure transition, and the inter-action transition is controlled by discriminative boundary model.

1. Substructure Transition

Rather than a uniform motion type, a real-world human action is usually characterized by a set of inhomogeneous units with some instinct structure, which may be referred to herein as "substructure." Action substructure typically arises from two factors: (1) the hierarchical nature of activity, where one action can be temporally decomposed into a series of primitives with spatial-temporal constraints; (2) the large variance of action dynamics due to differences in kinematical property of subjects, feedback from environment, or interaction with objects.

For the first factor, multi-class Support Vector Machine (SVM) with Dynamic Programming has been used to recognize coherent motion constituent parts in an action. Latent-SVM has been applied for temporal evolving of "attributes" in actions. Also, a two-layer Maximum Entropy Markov Models (MEMM) has been suggested to recognize the correspondence between sub-activities and human skeletal features.

For the second factor, methods have been proposed to consider the substructure variance caused by subject-object interaction with Connected Hierarchic Conditional Random Field (CRF), and the substructure caused by pose variance with Latent Pose CRF.

In more general case, a Latent Dynamic CRF (LDCRF) algorithm has been presented. The LDCRF algorithm includes an added "latent-dynamic" layer into CRF for hidden substructure transition. One key limitation with CRF as a discriminative method is that one single pseudo-likelihood score is estimated for an entire sequence, which is incapable to interpret the probability of each individual frame. To solve the problem, embodiments presented herein include a generative model 105 as presented in FIG. 1(b), with extra hidden node Z gating the transition amongst a set of dynamic systems, and the posterior for every action can be inferred strictly under Bayesian framework for each individual frame. Since generative model usually requires large amount of training data, to overcome the limitation, effective prior constraints are introduced in the training process as explained in Section B (below).

2. Duration Model

The duration information of actions is helpful in determining the boundary where one action transits to another in continuous recognition tasks. Duration model has been adopted in Hidden Markov Model (HMM) based methods, such as the explicit duration HMM or more generally the Hidden Semi Markov Model (HSMM). Incorporating duration model into SSM is more challenging than HMM because SSM has continuous state space, and exact inference in SSM is intractable. Some works reported in this line include for music transcription and for economics. A duration constraint has been imposed at the top level of SLDS to achieve improved performance for honeybee behavior analysis. In general, naive integration of duration model into SSM is not effective, because duration patterns vary significantly across visual data and limited training samples may bias the model with incorrect duration patterns.

To address this problem, as presented in the embodiment depicted in FIG. 1(b), the model 105 correlates duration node D with the continuous hidden state node X and the substructure transition node Z as explained in Section C. In this way, the duration model becomes more discriminative than conventional generative duration models, and the data-driven boundary locating process can accommodate more variation in duration length.

In summary, aspects of the present invention incorporate at least two additional models into a general SSM, namely the Substructure Transition Model (STM) and the Discriminative Boundary Model (DBM). In embodiments, a Rao-Blackwellised particle filter is also designed for efficient inference of the model in Section D. Embodiments of efficient training and inference algorithms to support continuous action recognition are also presented.

Experiments in Section F demonstrate the superior performance of embodiments of the present invention over several existing state-of-the-arts in continuous action recognition.

B. Substructure Transition Model (STM)

Linear Dynamic Systems (LDS) is the most commonly used SSM to describe visual features of human motions. LDS is modeled by the following distributions:

$$p(Y_t=y_t|X_t=x_t)=\mathcal{N}(y_t;Bx_t,R) \quad (1)$$

$$p(X_{t+1}=x_{t+1}|X_t=x_t)=\mathcal{N}(x_{t+1};Ax_t,Q) \quad (2)$$

where $Y_t$ is the observation at time t, $X_t$ is a latent state, $\mathcal{N}(x;\mu,\Sigma)$ is multivariate normal distribution of x with mean $\mu$ and covariance $\Sigma$. To consider multiple actions, SLDS is formulated as a mixture of LDS's with the switching among them controlled by action class $S_t$. However, each LDS can only model an action with homogenous motion, ignoring the complex substructure within the action. In embodiments, a discrete hidden variable $Z_t$ is introduced to explicitly represent such information, and the substructure transition model can be stated as:

$$p(Y_t=y_t|X_t=x_t,S_t^i,Z_t^j)=\mathcal{N}(y_t;B^{ij}x_t,R^{ij}) \quad (3)$$

$$p(X_{t+1}=x_{t+1}|X_t=x_t,S_t^i,Z_{t+1}^j)=\mathcal{N}(x_{t+1};A^{ij}x_t,Q^{ij}) \quad (4)$$

where $A^{ij}$, $B^{ij}$, $Q^{ij}$, and $R^{ij}$ are the LDS parameters for the $j^{th}$ action primitive in the substructure of $i^{th}$ action class. In embodiments, $\{Z_t\}$ is modeled as a Markov chain and the transition probability is specified by multinomial distribution:

$$p(Z_{t+1}^j|Z_t^i,S_t^k)=\theta_{ijk} \quad (5)$$

Figure 2:
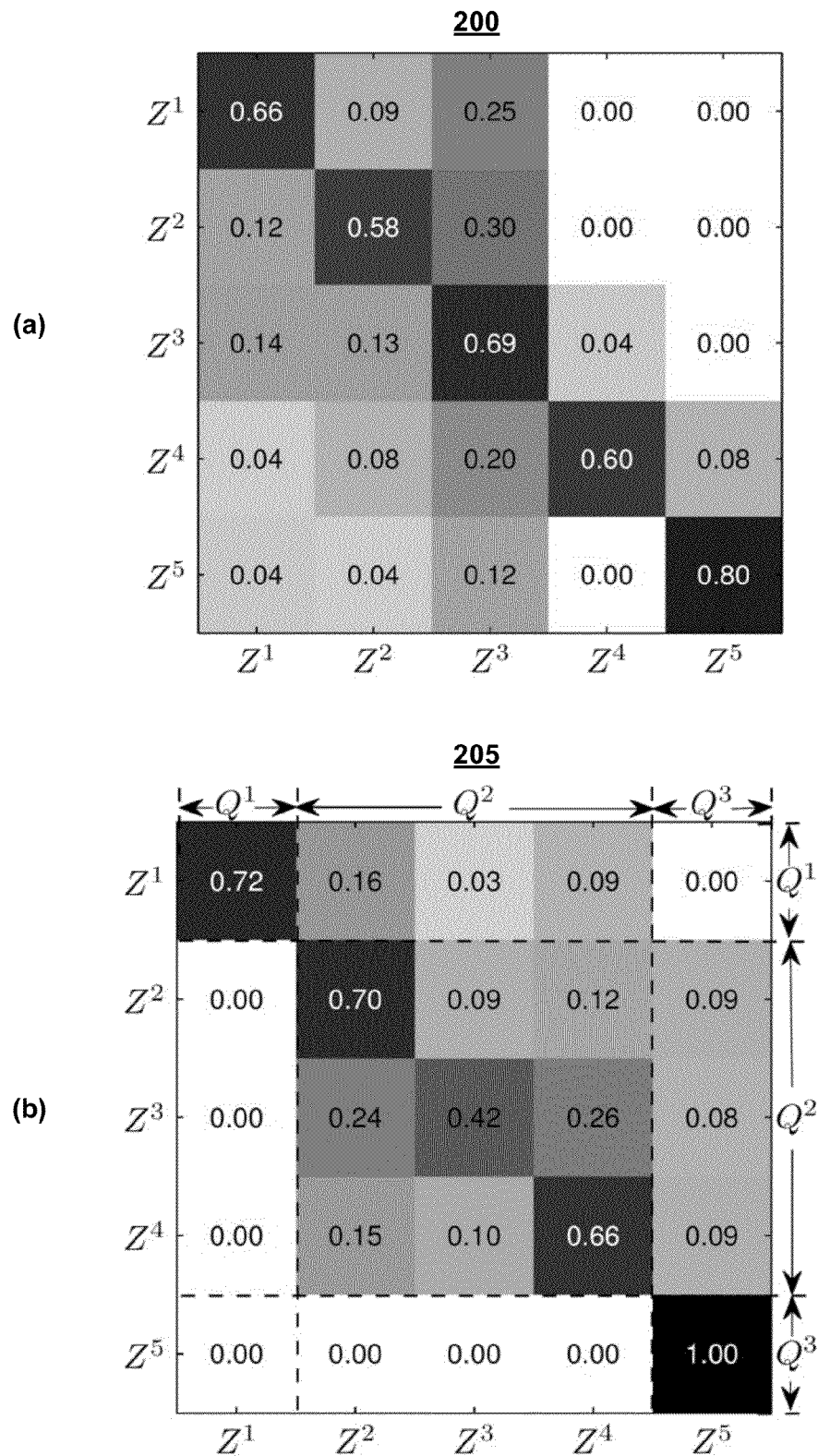
FIG. 2 depicts an example of a Substructure Transition Model (STM) trained for action "move-arm" in stacking dataset using (a) sparse and (b) block-wise sparse constraints, according to embodiments of the present invention.

In the following, the term STM may refer to either the transition matrix in Equation (5) or the overall substructured SSM depending on its context. Some examples of STM are given in FIG. 2, which presents STM trained for action "move-arm" in a stacking dataset using (a) sparse (200) and (b) block-wise sparse constraints (205), with $N_Z=5$ and $N_Q=3$. Note that the STM 205 in FIG. 2 better captures global ordering. The STM training is explained in more detail in the remainder of this section.

1. Sparsity Constrained STM

In embodiments, a simplified notation $\Theta=\{\theta_{ij}\}$ will be used for the STM within a single action. An unconstrained $\Theta$ implies that the substructure of action primitives may be organized in an arbitrary way. In embodiments, for most real-world human actions, however, there is a strong temporal ordering associated with the primitive units. Such order relationship can be vital to accurate action recognition as well as robust model estimation.

Figure 3:
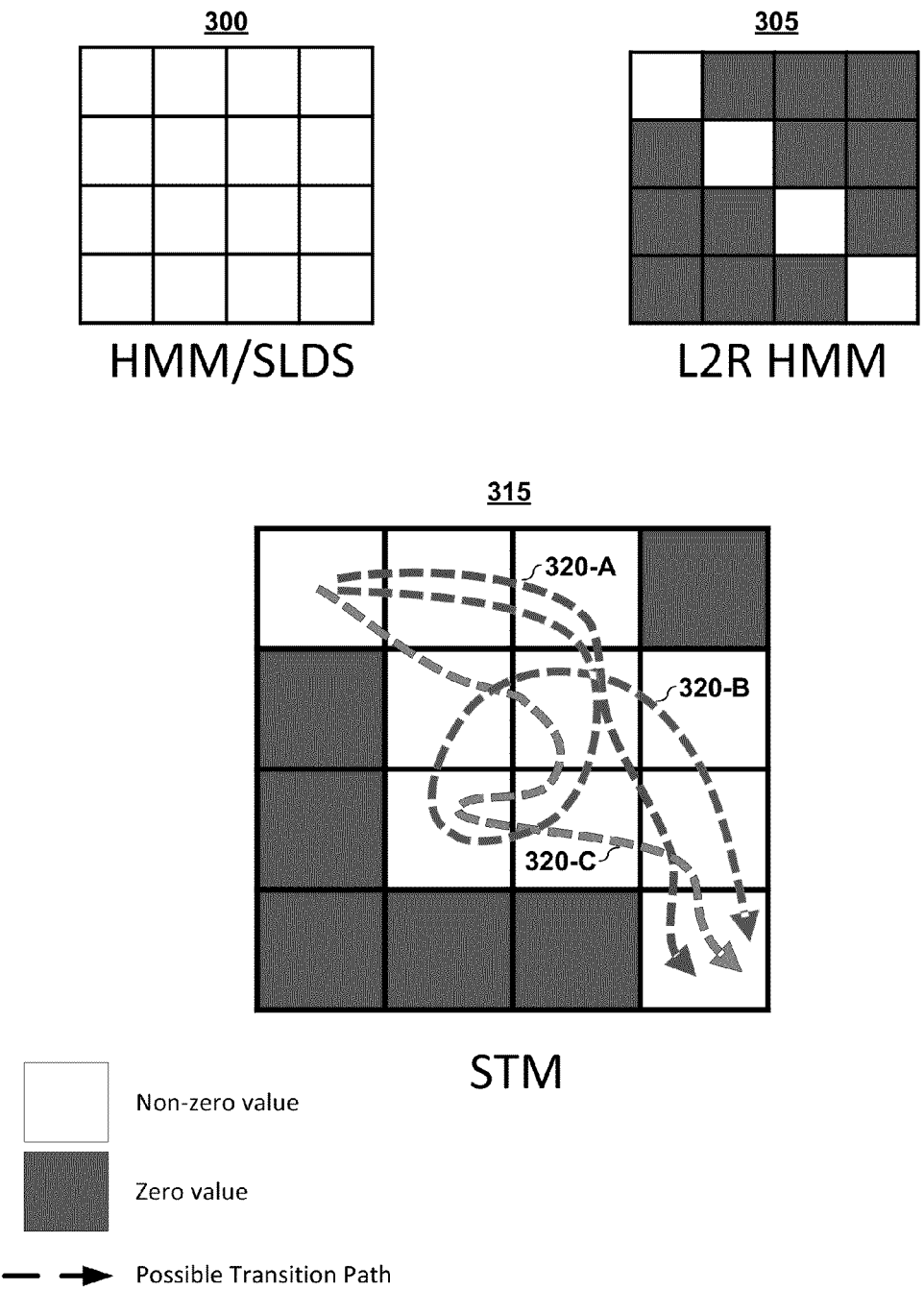
FIG. 3 depicts, by way of example, the difference between prior transition approaches and that of the present patent document according to embodiments of the present invention.

There have been some attempts to encode a fixed order relationship among primitive units by restricting the locations of non-zero elements in transition matrix $\Theta$; examples include the left-to-right HMM, switching HMM (SHMM), and factorial HMM. FIG. 3 depicts, by way of example, the difference between prior approaches and that of the present patent document according to embodiments of the present invention. Unconstrained transition matrices, such as those in HMM and SLDS 305, are deficient because they fail to appreciate strong temporal ordering that can exist with the primitive units. Others that apply some constraints, such as left-to-right HMM 310, specify the temporal ordering a priori. In many cases, it is difficult to specify the temporal ordering a priori, and a more practical approach is to impose a sparse transition constraint while leaving the discovery of exact order relationship to training phase. As shown in FIG. 3, the dynamic substructure modeling facilitates only some blocks in the transition matrix 315 taking positive value. This enables the modeling of sequential structure as well as local variation in action sequences (e.g., 320-A, 320-B, 320-C).

Along this direction, negative Dirichlet distribution has been proposed as a prior for each row $\theta_i$ in $\Theta$:

$$p(\theta_i) \propto \prod_j \theta_{ij}^{-\alpha}$$

where $\alpha$ is a pseudo count penalty. The maximum a posteriori probability (MAP) estimation of parameter is $$\hat{\theta}_{ij} = \frac{\max(\xi_{ij}-\alpha, 0)}{\sum_t \max(\xi_{it}-\alpha, 0)} \quad (6)$$

where $\xi_{ij}$ is the sufficient statistics of $\langle Z_t^i, Z_{t+1}^j \rangle$. When the number of transitions from $z^i$ to $z^j$ in training data is less than $\alpha$, the probability $\theta_{ij}$ is set to zero. The sparsity enforced in this way often leads to local transition patterns sensitive to noise or incomplete data, as show in FIG. 2(a). Also, the penalty term $\alpha$ introduces bias to the proportion of non-zero transition probabilities, i.e.

$$\frac{\hat{\theta}_{ij}}{\hat{\theta}_{ik}} \neq \frac{\xi_{ij}}{\xi_{ik}}.$$

In embodiments, this bias may be severe especially when $\xi_{ij}$ is small.

2. Block-Wise Sparse STM

In embodiments, for tradeoff between model sparsity and flexibility, a block-wise sparse transition model may be used to regularize the global topology of action substructure. The idea is to divide an action into several stages and each stage comprises a subset of action units. In embodiments, the transition between stages is encouraged to be sequential but sparse, such that the global action structure can be modeled. At the same time, the action units within each stage can propagate freely from one to another so that variation in action styles and parameters is also preserved.

In embodiments, formally, define discrete variable $Q_t \in \{1, \ldots, NQ\}$ as the current stage index of action, and assume a surjective mapping function $g(\cdot)$ is given which assigns each action primitive $Z_t$ to its corresponding stage $Q_t$:

$$\begin{cases} p(Q_t^q, Z_t^i) > 0, & \text{if } g(i) = q \\ p(Q_t^q, Z_t^i) = 0. & \text{otherwise} \end{cases} \quad (7)$$

The choice of $g(\cdot)$ depends on the nature of action. Intuitively, more action units may be assigned to a stage with diversified motion patterns and less action units to a stage with restricted pattern. In embodiments, the joint dynamic transition distribution of $Q_t$ and $Z_t$ is:

$$p(Q_{t+1}, Z_{t+1}|Q_t, Z_t) = p(Q_{t+1}|Q_t) p(Z_{t+1}|Q_{t+1}, Z_t) \quad (8)$$

In embodiments, the second term of Equation (8) specifies the transition between action primitives, which are kept flexible to model diversified local action patterns. The first term captures the global structure between different action stages, and therefore, in embodiments, an ordered negative Dirichlet distribution is imposed as its hyper-prior:

$$p(\Phi) \propto \prod_{q \neq r, q+1 \neq r} \phi_{qr}^{-\alpha} \quad (9)$$

where $\Phi = \{\phi_{qr}\}$ is the stage transition probability matrix, $\phi_{qr} = p(Q_{t+1}^r | Q_t^q)$, and $\alpha$ is a constant for pseudo count penalty. The ordered negative Dirichlet prior encodes both sequential order information and sparsity constraint. It promotes statistically a global transition path $Q^1 \to Q^2 \to \ldots \to Q^{NQ}$ which can be learned from training data rather than heuristically defined as that in left-to-right HMM. An example of a resulting STM is shown in FIG. 2(b) 205, where action unit $Z_t$ can transit, with certain probability, from the starting stage $Q^1$ to the intermediate stage $Q^2$, or from $Q^2$ to the terminating stage $Q^3$, while transiting directly from $Q^1$ to $Q^3$ is prohibited. Note that, in embodiments, no in-coming/out-going transition is encouraged for $Q^1/Q^{NQ}$, which stands for starting/terminating stage. In embodiments, the identification of these two special stages is helpful for segmenting continuous actions, as will be discussed in Section C.2.

3. Learning STM

In embodiments, the MAP model estimation involves maximizing the product of likelihood (Equation (8)) and prior (Equation (9)) under the constraint of Equation (7). There are two interdependent nodes, Q and Z, involved in the optimization, which make the problem complicated. Equation (8) may be replaced with the transition distribution of single variable Z in Equation (5), and a constraint exists for the relationship between $\Theta$ and $\Phi$. Therefore, in embodiments, the node Q (and the associated parameter $\Phi$) serves for conceptual purpose and may be eliminated in final model construction. In embodiments, the MAP estimation can be converted to the following constrained optimization problem:

$$\max_{\Theta} \mathcal{L}(\Theta) = \sum_{i,j} \xi_{ij} \log \theta_{ij} - \sum_{\substack{q \neq r \\ q+1 \neq r}} \alpha \log \phi_{qr} \quad (10)$$

$$\text{s.t.} \quad \phi_{qr} = \sum_{j \in G(r)} \theta_{ij}, \, i \in G(q), \, \forall r$$

$$\sum_j \theta_{ij} = 1, \, \forall i \quad \theta_{ij} \geq 0, \, \forall i, j$$

where $\xi_{ij}$ is sufficient statistics of $\langle Z_t^i, Z_{t+1}^j \rangle$, $$G(q) \triangleq \{i \,|\, g(i) = q\},$$

and $\{\phi_{qr}\}$ are auxiliary variables. In embodiments, the optimal solution is $$\hat{\theta}_{ij} = \hat{\phi}_{g(i),g(j)} \frac{\xi_{ij}}{\sum_{j' \in G(r)} \xi_{ij'}} \quad (11)$$

$$\hat{\phi}_{qr} = \frac{\max\left(\sum_{i \in G(q), j \in G(r)} \xi_{ij} - \alpha_{qr}, 0\right)}{\sum_{r'} \max\left(\sum_{i \in G(q), j \in G(r')} \xi_{ij} - \alpha_{qr'}, 0\right)}$$

where $\alpha_{qr}$ is equal to $\alpha$ if $q \neq r$ or $(q+1) \neq r$, and 0 otherwise. As can be seen, the resultant $\hat{\Theta}$ is a block-wise sparse matrix, which can characterize both the global structure and local detail of action dynamics. Also, within each block (stage), there is no bias in $\hat{\theta}_{ij}$.

C. Discriminative Boundary Model (DBM)

For one of ordinary skill in the art, it is straightforward to use a Markov chain to model the transition of action $S_t$ by, $p(S_{t+1}^j | S_t^i) = a_{ij}$. The duration information of the $i^{th}$ action is naively incorporated into its self-transition probability $a_{ii}$, which leads to an exponentially-distributed action duration model:

$$p(dur_i = \tau) = a_{ii}^{\tau-1}(1-a_{ii}), \tau = 1, 2, 3 \ldots$$

Unfortunately, only a limited number of real-life events have an exponentially diminishing duration. Inaccurate duration modeling can severely affect ability to segment consecutive actions and identify their boundaries.

In embodiments, non-exponential duration distribution may be implemented with duration-dependent transition matrix, such as the one used in HSMM. Fitting a transition matrix for each epoch in maximum length of duration is often impossible given a limited number of training sequences, even parameter hyperprior such as hierarchical Dirichlet distribution is used to restrict model freedom. Parametric duration distributions such as gamma and Gaussian provide a more compact way to represent duration and show good performance in signal synthesis. However, they are less useful in inference because the corresponding transition probability is not easy to evaluate.

1. Logistic Duration Model

In embodiments, a new logistic duration model is provided to overcome the above limitation. In embodiments, a variable $D_t$ is introduced to represent the length of time current action has been lasting. $\{D_t\}$ is a counting process starting from 1, and the beginning of a new action is triggered whenever it is reset to 1:

$$p(S_{t+1}^j \mid S_t^i, D_{t+1}^d) = \begin{cases} \delta(j-i), & \text{if } d > 1 \\ a_{ij}, & \text{if } d = 1 \end{cases} \quad (12)$$

where $a_{ij}$ is the probability of transiting from previous action i to new action j. Notice that the same type of action may be repeated if $a_{ii} > 0$.

In embodiments, instead of modeling action duration distribution directly, we model the transition distribution of $D_t$ as a logistic function of its previous value:

$$p(D_{t+1}^c \mid S_t^i, D_t^d) = \frac{e^{v_i(d - \beta_i)} \delta(c - 1) + \delta(c - d - 1)}{1 + e^{v_i(d - \beta_i)}} \quad (13)$$

where $v_i$ and $\beta_i$ are positive logistic regression weights. Equation (13) immediately leads to the duration distribution for action class i:

$$p(dur_i = \tau) = \prod_{d=1}^{\tau} \frac{1}{1 + e^{v_i(d - \beta_i)}} \times e^{v_i(\tau - \beta_i)} \quad (14)$$

Figure 4A:
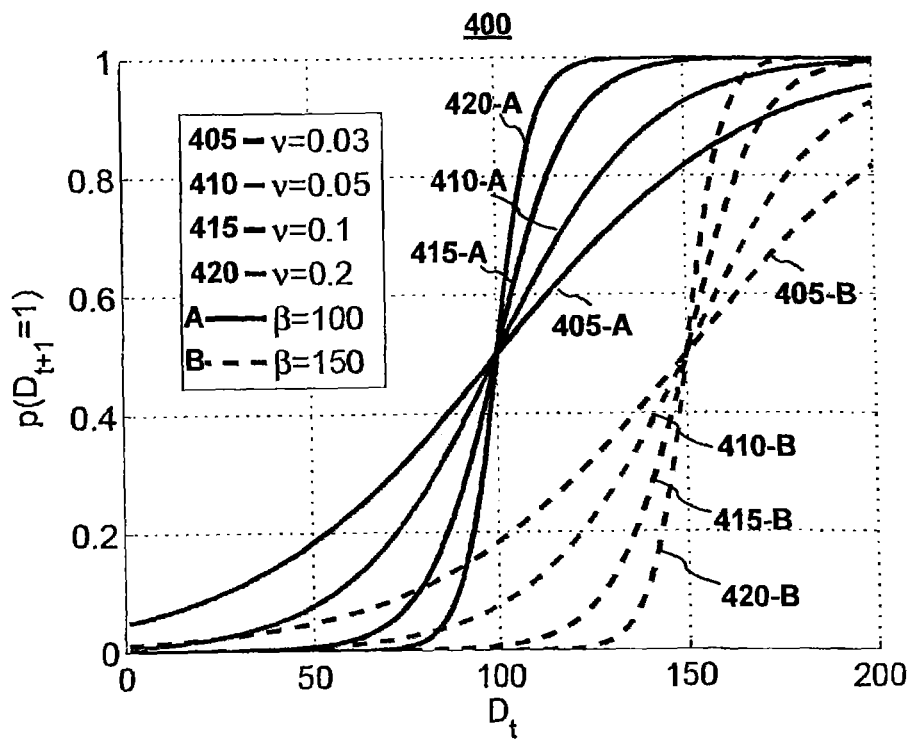
FIG. 4(a) depicts resetting probability $p(D_{i+1}=1|D_i, S_t)$ for the logistic duration model, according to embodiments of the present invention, plotted with different line style for different $v$ and $\beta$ parameter values.
Figure 4B:
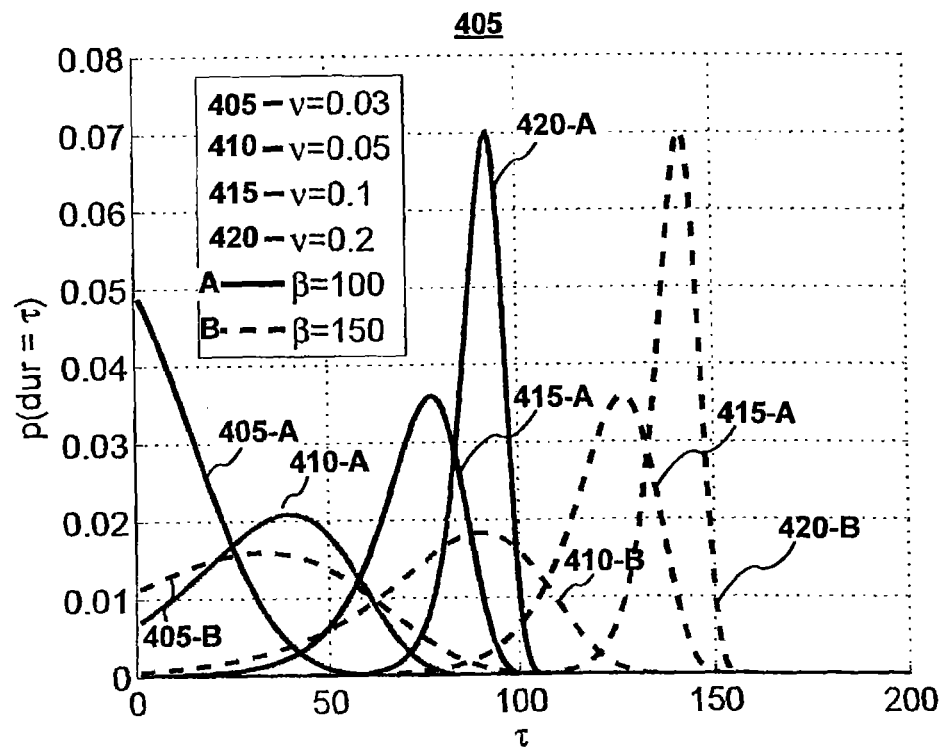
FIG. 4(b) depicts duration distribution for logistic duration model, according to embodiments of the present invention, plotted with different line style for different $v$ and $\beta$ parameter values.

FIG. 4(a) shows how the probability of $D_{t+1}$ changes as a function of $D_t$ with different parameter sets, and the corresponding action duration distribution is plotted in FIG. 4(b). The increasing probability of transiting to a new action leads to a duration distribution, with center and width controlled by $\beta_i$ and $v_i$, respectively.

2. Discriminative Boundary Model (DBM)

In embodiments, merely stacking the logistic duration layer (D-S) onto the STM layer (Z-X-Y) leads to a generative SSM, which is unable to utilize contextual information for accurate action boundary segmentation. Discriminative graphic models, such as MEMM and CRF, are generally more powerful in such classification problem except that they ignore data likelihood or suffer from label bias problem.

In embodiments, to integrate discriminating power into the action boundary model of the present invention and at the same time keep the generative nature of the action model itself, a DBM is constructed by further augmenting the duration dependency with the contextual information from latent states X and Z so that the switching between actions becomes more discriminative:

$$p(D_{t+1}^1 \mid S_t^i, D_t^d, X_t^x, Z_t^j) = \frac{e^{v_i(d - \beta_i) + \omega_{ij}^T x}}{1 + e^{v_i(d - \beta_i) + \omega_{ij}^T x}} \quad (15)$$

where $v_i$, $\beta_i$ have the same interpretation as in Equation (13), and $\omega_{ij}$ are the additional logistic regression coefficients. When $\omega_{ij}^T x = 0$, no information can be learned from $X_t$ and $Z_t$, and the DBM reduces to a generative one as Equation (13). A similar logistic function has been employed in augmented SLDS, where the main motivation is to distinguish between transitions to different states based on latent variable. Embodiments of the current DBM are specifically designed for locating the boundary between contiguous actions. Such embodiments rely on both real valued and categorical inputs.

In embodiments, as constrained by the STM in Subsection B.2, each action is likely to terminate in stage $N_Q$. Therefore, $D_{t+1}$ may be reset to 1 only when the current action is in this terminating stage, and Equation (15) may be modified as:

$$p(D_{t+1}^1 \mid S_t^i, D_t^d, X_t^x, Z_t^j) = \begin{cases} \text{Eq. (15)}, & g(j) = N_Q \\ 0, & \text{otherwise} \end{cases} \quad (16)$$

In this way, the number of parameters is greatly reduced and the label unbalance problem is also ameliorated. The result is a completion of the construction of the SSM model for continuous action recognition according to embodiments of the present invention, with an overall structure such as the embodiment 105 depicted in FIG. 1(b).

3. Learning DBM

In embodiments, to learn or train the parameters $v$, $\beta$ and $\omega$, a coordinate descent method may be used to iterate between $\{v, \beta\}$ and $\omega$. For $v$ and $\beta$, given a set of training state sequences $\{S_n\}$, the labels for all $\{D_n\}$ may be easily obtained according to Equation (12) and Equation (13). Then fitting the logistic duration model of Equation (13) equals to performing logistic regression with input feature $x = D_t$ and output $y = \delta(S_{t+1} - S_t)$. The action transition probability $\{a_{ij}\}$ may be obtained trivially, by counting the number of transitions from action type i to action type j in the entire training set.

In embodiments, to estimate $\omega_{ij}$, let $\{T^{(n)}\}_{n=1...N}$ be the training set, where each data sample $T^{(n)}$ is a realization of all the nodes involved in Equation (15) at a particular time instance $t^{(n)}$ and $S_{t^{(n)}} = i$. Since $X_{t^{(n)}}$ and $Z_{t^{(n)}}$ are hidden variables, their posterior $$p(Z_{t^{(n)}}^j \mid \bullet) = p_Z^{(n)} \text{ and}$$

$$p(X_{t^{(n)}}^x \mid Z_{t^{(n)}}^j, \bullet) = \mathcal{N}(x; \mu^{(n)}, \Sigma^{(n)})$$

are first inferred from single action STM, where the posterior of $X_{t^{(n)}}$ is approximated by a Gaussian. The estimation of $\hat{\omega}_{ij}$ is obtained by maximizing the expected log likelihood:

$$\max_{\omega_{ij}} \sum_n E_{p\left(X_{t^{(n)}}^x, Z_{t^{(n)}}^j \mid \bullet\right)}[\log f^{(n)}(x, \omega_{ij})] = \quad (17)$$

$$\max_{\omega_{ij}} \sum_n p_Z^{(n)} \int_x \log f^{(n)}(x, \omega_{ij}) N(x; \mu^{(n)}, \Sigma^{(n)}) dx$$

where $$f^{(n)}(x, \omega) = \frac{e^{(c^{(n)} + \omega^T x)} b^{(n)}}{1 + e^{c^{(n)} + \omega^T x}} \quad (18)$$

and $$b^{(n)} = p(D_{t^{(n)}+1} = 1), \ c^{(n)} = v_i(D_{t^{(n)}} - \beta_i).$$

The integral in Equation (17) cannot be solved analytically. Instead, in embodiments, an unscented transform is used to approximate the Gaussian $\mathcal{N}(x; \mu^{(n)}, \Sigma^{(n)})$ using a set of sigma points $\{x_k^{(n)}\}_{k=0...2M}$. Therefore, Equation (17) converts to a weighted logistic regression problem with features $\{x_k^{(n)}\}$, labels $\{b^{(n)}\}$, and weights $\{p_Z^{(n)}/(2M+1)\}$.

D. Rao-Blackwellised Particle Filter Inference

In testing, given an observation sequence $y_{1:T}$, we want to find the MAP action labels $\hat{S}_{1:T}$ and the boundaries defined by $\hat{D}_{1:T}$; we are also interested in the study of actions which can be revealed from $\hat{Z}_{1:T}$. Evaluating the full posterior $p(S_{1:T}, D_{1:T}, Z_{1:T} \mid y_{1:T})$ is a non-trivial job given the complex hierarchy of the model presented herein. In embodiments, a particle filtering may be used for online inference due to its capability in non-linear scenario and temporal scalability. It shall be noted that, in embodiments, the latent variable $X_t$ may be marginalized by Rao-Blackwellisation, and the computation of particle filtering is significantly reduced since Monte Carlo sampling is conducted in the joint space of $(S_t, D_t, Z_t)$, which has a low dimension and highly compact support.

Formally, in embodiments, the posterior distribution of all the hidden nodes at time t may be decomposed as $$p(S_t, D_t, Z_t, X_t | y_{1:t}) = p(S_t, D_t, Z_t | y_{1:t}) p(X_t | S_t, D_t, Z_t, y_{1:t}) \quad (19)$$

In Rao-Blackwellised particle filter, a set of $N_P$ samples $\{(s_t^{(n)}, d_t^{(n)}, z_t^{(n)})\}_{n=1}^{N_P}$ and the associated weights $\{w_t^{(n)}\}_{n=1}^{N_P}$ are used to approximate the intractable first term in Equation (19), while the second term is represented by $\{\chi_t^{(n)}(x)\}_{n=1}^{N_P}$, which are analytical distributions conditioned on corresponding samples:

$$\chi_t^{(n)}(x) \triangleq p(X_t = x | s_t^{(n)}, d_t^{(n)}, z_t^{(n)}, y_{1:t}) \quad (20)$$

In embodiments of the model presented herein, $\chi_t^{(n)}(x) = \mathcal{N}(x; \hat{x}_t^{(n)}, P_t^{(n)})$ is a Gaussian distribution. Thus, the posterior may be represented as $$p(S_t, D_t, Z_t, X_t | y_{1:t}) \approx \sum_{n=1}^{N_P} w_t^{(n)} \delta_{S_t}(s_t^{(n)}) \delta_{D_t}(d_t^{(n)}) \delta_{Z_t}(z_t^{(n)}) \chi_t^{(n)}(x) \quad (21)$$

where the approximation error approaches to zero as $N_P$ increases to infinite.

Given the samples $\{(s_{t-1}^{(n)}, d_{t-1}^{(n)}, z_{t-1}^{(n)}, \chi_{t-1}^{(n)}(x))\}$ and weights $\{w_{t-1}^{(n)}\}$ at time t−1, the posterior of $(S_t, D_t, Z_t)$ at time t may be evaluated as $$p(S_t, D_t, Z_t | y_{1:t}) \propto \sum_n w_{t-1}^{(n)} p(S_t | D_t, s_{t-1}^{(n)}) \times p(Z_t | S_t, D_t, z_{t-1}^{(n)}) \mathcal{L}_t^{(n)}(S_t, D_t, Z_t) \quad (22)$$

where $$\mathcal{L}_t^{(n)}(S_t, D_t, Z_t) = \int p(y_t | x_{t-1}, S_t, Z_t) \chi_{t-1}^{(n)}(x_{t-1}) \times p(D_t | s_{t-1}^{(n)}, d_{t-1}^{(n)}, z_{t-1}^{(n)}, x_{t-1}) dx_{t-1} \quad (23)$$

Equation (23) is essentially the integral of a Gaussian function with a logistic function. Although not solvable analytically, it can be well approximated by a re-parameterized logistic function. In embodiments, it may be approximated according to P. Maragakis, F. Ritort, C. Bustamante, M. Karplus, and G. E. Crooks, "Bayesian estimates of free energies from nonequilibrium work data in the presence of instrument noise," Journal of Chemical Physics, 129, 2008, which is incorporated in its entirety herein by reference. Nevertheless, it is hard to draw sample from Equation (23). Therefore, in embodiments, new samples $(s_t^{(n)}, d_t^{(n)}, z_t^{(n)})$ are drawn from a proposal density defined as:

$$q(S_t, D_t, Z_t | \cdot) = p(S_t | D_t, s_{t-1}^{(n)}) p(Z_t | S_t, D_t, z_{t-1}^{(n)}) \times p(D_t | s_{t-1}^{(n)}, d_{t-1}^{(n)}, z_{t-1}^{(n)}, \hat{x}_{t-1}^{(n)}) \quad (24)$$

The new sample weights may then be updated as $$w_t^{(n)} \propto w_{t-1}^{(n)} \frac{\mathcal{L}_t^{(n)}(s_t^{(n)}, d_t^{(n)}, z_t^{(n)})}{p(d_t^{(n)} | s_{t-1}^{(n)}, d_{t-1}^{(n)}, z_{t-1}^{(n)}, \hat{x}_{t-1}^{(n)})} \quad (25)$$

Once $s_t^{(n)}$ and $z_t^{(n)}$ are obtained, $\chi_t^{(n)}(x)$ is simply updated by Kalman filter. In embodiments, resampling and normalization procedures may be applied after all the samples are updated. In embodiments, resampling and normalization may be performed in like manner as discussed in A. Doucet, N. d. Freitas, K. P. Murphy, and S. J. Russell, "Rao-Blackwellised particle filtering for dynamic Bayesian networks," in Proceedings of the 16th Conference on Uncertainty in Artificial Intelligence, pages 176-183, 2000, which is incorporated in its entirety herein by reference.

E. Exemplary Training and Inferencing System and Method Embodiments

Given the framework presented above, examples of systems and methods that employ the inventive concepts of the state space model that include logistic duration modeling, substructure transition modeling, and discriminative boundary modeling are presented herein. It shall be noted that these embodiments are presented to elucidate some example applications, and that one skilled in the art shall recognize other applications (both systems and methods), and these additional applications shall be considered within the scope of the current patent document.

Figure 5:
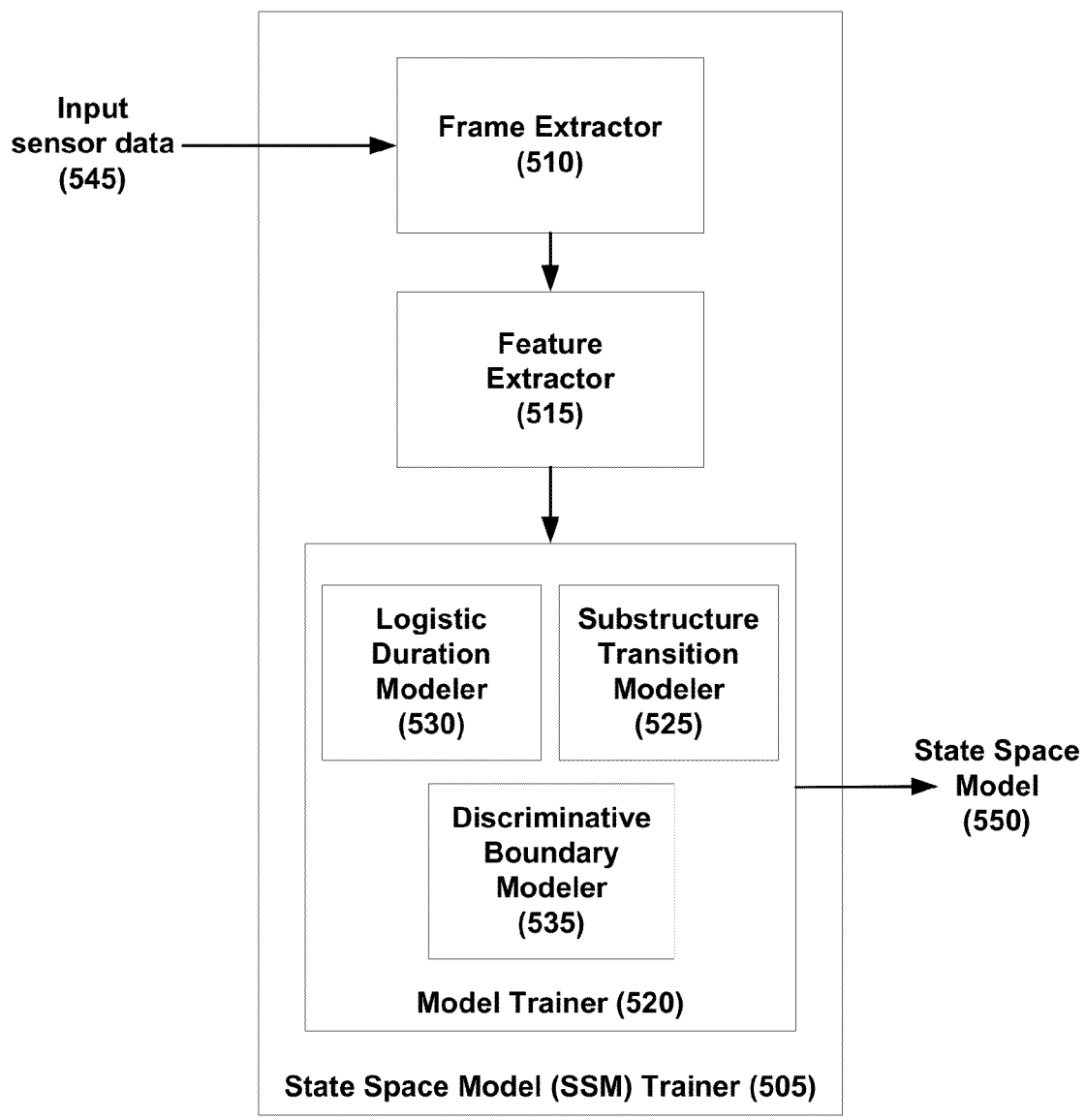
FIG. 5 depicts a block diagram of a trainer for developing a state space model that includes logistic duration modeling, substructure transition modeling, and discriminative boundary modeling training according to embodiments of the present invention.
Figure 6:
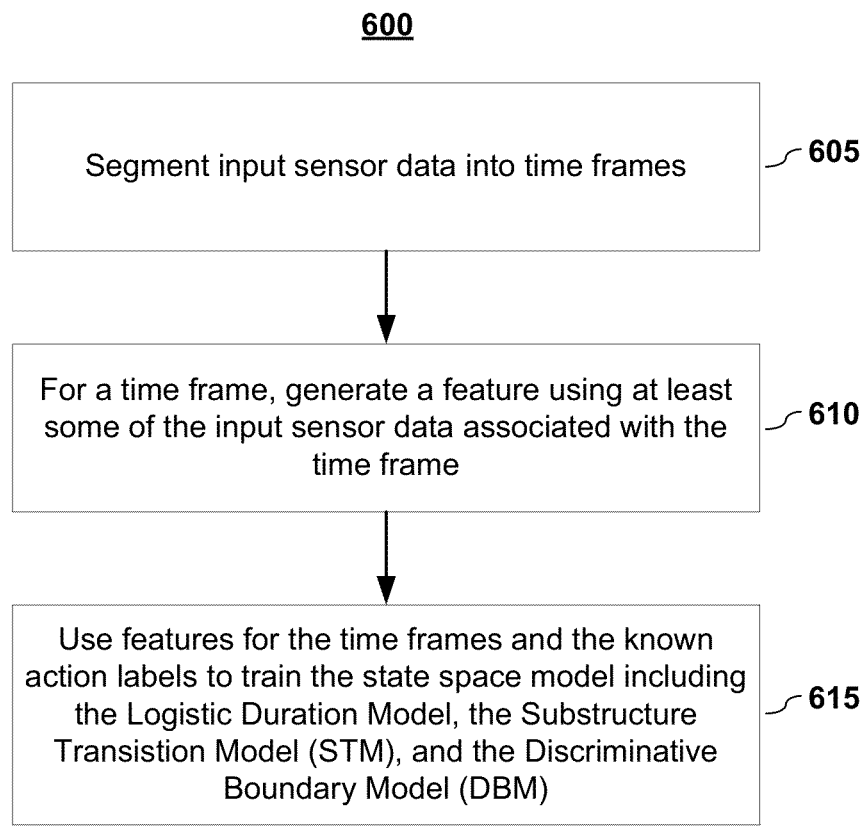
FIG. 6 depicts a general methodology for training a state space model that includes logistic duration modeling, substructure transition modeling, and discriminative boundary modeling training according to embodiments of the present invention.

FIG. 5 depicts a block diagram of a trainer for developing a state space model that includes logistic duration modeling, substructure transition modeling, and discriminative boundary modeling training according to embodiments of the present invention. And, FIG. 6 depicts a general methodology for training according to embodiments of the present invention.

As shown in FIG. 5, the model trainer 505 comprises a frame extractor 510, a feature extractor 515, and a model trainer 520. In embodiments, the frame extractor 510 received input sensor data 545, such as a video although other sensor data may be used, and segments (605) the data into a set of time frames. In embodiments, the feature extractor 515 receives the segmented data from the frame extractor 510 and extracts or generates (610) one or more features using at least some of the input sensor data to represent each segmented data frame. In embodiments in which the input sensor data is video data and the time frame data is image frames, an image feature for the image frame is generated to represent the image frame. One skilled in the art shall recognize that numerous ways exist for generating an image feature from an image frame. While any of a number of image features may be employed, in embodiments, the image feature may be an embedded optical flow feature, which is described in commonly assigned and co-pending U.S. patent application Ser. No. 13/405,986, filed on Feb. 27, 2012, entitled "EMBEDDED OPTICAL FLOW FEATURES," and listing as inventors Jinjun Wang and Jing Xiao, which is incorporated by reference herein in its entirety.

Using the features for the time frames and known action labels from the input training data 545, the state, space model trainer 520 trains the models, including the Logistic Duration Model, the Substructure Transition Model (STM), and the Discriminative Boundary Model (DBM). Thus, in embodiments, the model trainer 505 may comprise a substructure transition modeler 525, a logistic duration modeler 530, and a discriminative boundary modeler 535. In embodiments, the modelers 525-535 may utilize one or more of the methods discussed above to train the various models. The resultant output is an embodiment of a probabilistic model 550 for continuous action recognition that comprises at least two model components: substructure transition model and discriminative boundary model. In embodiments, the substructure transition model component encodes the sparse and global temporal transition prior between action primitives in state-space model to handle the large spatial-temporal variations within an action class. In embodiments, the discriminative boundary model component enforces the action duration constraint in a discriminative way to locate the transition boundaries between actions more accurately. In embodiments, the two model components are integrated into a unified graphical structure to enable effective training and inference. An embodiment of inference is discussed with respect to FIGS. 7 and 8.

Figure 7:
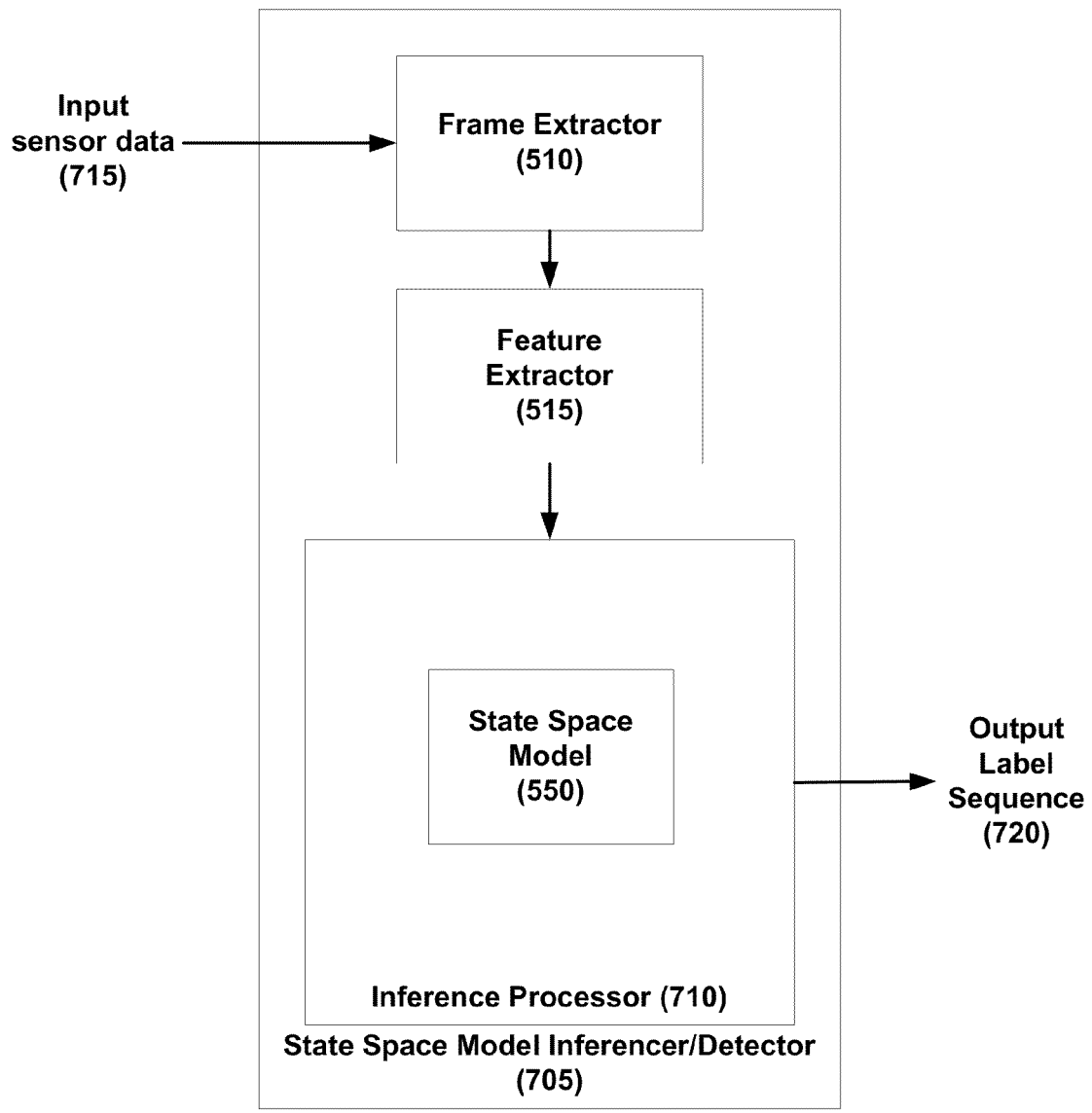
FIG. 7 depicts a block diagram of a detector or inferencer that uses a state space model that comprises logistic duration modeling, substructure transition modeling, and discriminative boundary modeling according to embodiments of the present invention.
Figure 8:
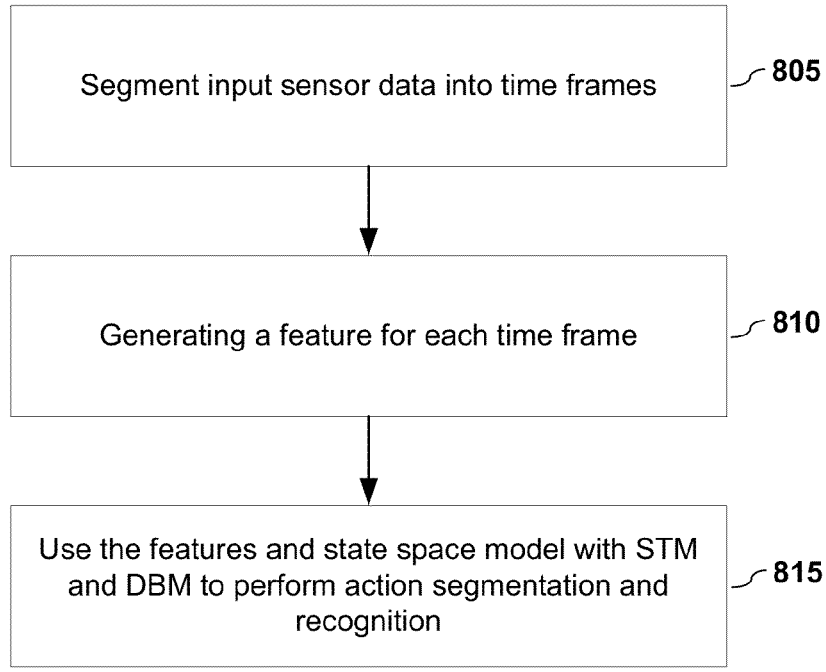
FIG. 8 depicts a general methodology for estimating a sequence of optimal action labels, action boundaries, and action unit indexes given observation data using the detector or inferencer according to embodiments of the present invention.

FIG. 7 depicts a block diagram of a detector or inferencer 705 that uses a state space model comprising logistic duration modeling, substructure transition modeling, and discriminative boundary modeling according to embodiments of the present invention. And, FIG. 8 depicts a general methodology for estimating a sequence of optimal action labels, action boundaries, and action unit indexes given observation data using the detector or inferencer 705 according to embodiments of the present invention.

As shown in FIG. 7, the inference 705 comprises a frame extractor 510, a feature extractor 515, and a trained state space model 550. In embodiments, the frame extractor 510 received input sensor data 715, such as a video although other sensor data may be used, and segments (805) the data into a set of time frames. In embodiments, the feature extractor 515 receives the segmented data from the frame extractor 510 and extracts or generates (810) one or more features using at least some of the input sensor data to represent each segmented data frame—as previously discussed above. This feature information is supplied to the inference processor 710 that uses the trained state space model that includes the STM and DBM to output the action labels. In embodiments, the detector. 705 may also output action boundaries and action unit indexes.

F. Experimental Results

Experimental results on both public and in-house datasets have shown that, with the capability to incorporate additional information that had not been explicitly or efficiently modeled by previous methods, the embodiments presented herein achieved significantly improved performance for continuous action recognition.

An embodiment of the present invention was tested on four datasets for continuous action recognition. In all the experiments, the parameters $N_Q=3$, $N_Z=5$, and $N_P=200$ were used. In embodiments, STM was trained independently for each action using the segmented sequences in training set; then DBM was trained from the inferred terminal stage of each sequence. The overall learning procedure follows expectation-maximization (EM) paradigm where the beginning and terminating stages are initially set as the first and last 15% of each sequence, and the initial action primitives are obtained from K-means clustering. The EM iteration stops when the change in likelihood falls below a threshold. In testing, after the online inference using particle filter, each action boundary may be further adjusted using an off-line inference within a local neighborhood of length 40 centered at the initial boundary; in this way, the locally "full" posterior in Section D is considered. The recognition performance was evaluated by per-frame accuracy. Contribution from each model component (STM and DBM) was analyzed separately.

1. Public Dataset

The first public dataset used was the IXMAS dataset. The dataset contains 11 actions, each performed 3 times by 10 actors. The videos were acquired using 5 synchronized cameras from different angles, and the actors freely changed their orientation for each acquisition. The dense optical flow in the silhouette area of each subject was calculated, from which Locality-constrained Linear Coding features (LLC) were extracted as the observation in each frame. 32 codewords and 4×4, 2×2, and 1×1 spatial pyramid were used. Table 1 reports the continuous action recognition results, in comparison with Switching LDS (SLDS), Conditional Random Fields (CRF), and Latent-Dynamic CFR (LDCRF). The embodiment of the current invention (and each of its components) achieved recognition accuracy higher than all the other methods by more than 10%.

TABLE 1

Continuous action recognition for IXMAS dataset

| SLDS | CRF | LDCRF | STM | DBM | STM + DBM |
|---|---|---|---|---|---|
| 53.6% | 60.6% | 57.8% | 70.2% | 74.5% | 76.5% |

The second public dataset used was the Carnegie Mellon University Motion Capture Database (CMU MoCap) dataset. For comparison purpose, the results from the complete subset of subject 86 is reported. The subset has 14 sequences with 122 actions in 8 categories. Quaternion feature was derived from the raw MoCap data as our observation for inference. Table 2 lists the continuous action recognition results, in comparison with the same set of benchmark techniques as in the first experiment, as well as compared with of the approaches in N. Ozay, M. Sznaier, and C. O, "Sequential sparsification for change detection," in Proc. of Computer Vision and Pattern Recognition (CVPR '08), pp. 1-6, 2008 (hereinafter, "Ref. 1") and in M. Raptis, K. Wnuk, and S. Soatto, "Spike train driven dynamical models for human actions," in Proc. of Computer Vision and Pattern Recognition (CVPR '10), pp. 2077-2084, 2010 (hereinafter, "Ref. 2"). Each of the references is incorporated herein by reference in its entirety. Similarly, results from this experiment demonstrated the superior performance of embodiments of the present invention. It shall be noted that, in Table 2, the frame-level accuracy by using DBM alone is a little higher than its combination with STM. This is because there is only one subject in this experiment and no significant variation in substructure is presented in each action type, so temporal duration plays a more important role in recognition. Nevertheless, the result attained by STM+DBM was superior than all benchmark methods.

TABLE 2

Continuous action recognition for CMU MoCap dataset

| SLDS | CRF | LDCRF | Ref. 1 | Ref. 2 |
|---|---|---|---|---|
| 80.0% | 77.23% | 82.53% | 72.27% | 90.94% |
| STM | | DBM | | STM + DBM |
| 81.0% | | 93.3% | | 92.1% |

2. In-House Dataset

In addition to the above two public datasets, two in-house datasets were also captured. The actions in these two sets feature stronger hierarchical substructure. The first dataset contains videos of stacking/unstacking three colored boxes, which involves actions of "move-arm", "pickup," and "put-down." Thirteen (13) sequences with 567 actions were recorded in both Red-Green-Blue and depth videos with one Microsoft Kinect sensor. Then object tracking and 3D reconstruction were performed to obtain the 3D trajectories of two hands and three boxes. In this way, an observation sequence in $\mathbb{R}$ 15 was generated. In the experiments, leave-one-out cross-validation was performed on the 13 sequences. The continuous recognition results are listed in Table 3. It shall be noticed that, among the four benchmark techniques, the performance of SLDS and CRF were comparable, while LDCRF achieved the best performance. This is reasonable because during the stacking process, each box can be moved/stacked at any place on the desk, which leads to large spatial variations that cannot be well modeled by a Bayesian Network of only two layers. LDCRF applied a third layer to capture such "latent dynamics," and hence achieved best accuracy. For embodiments of the present invention, the STM alone brings SLDS to a comparable accuracy to LDCRF because it also models the action substructure. By further incorporating duration information, embodiments of the present invention outperformed all benchmark approaches.

TABLE 3

Continuous action recognition for Set I: Stacking

| SLDS | CRF | LDCRF | STM | DBM | STM + DBM |
|---|---|---|---|---|---|
| 64.4% | 79.6% | 90.3% | 88.5% | 81.3% | 94.4% |

The second in-house dataset was more complicated than the first one. It involved five actions, "move-arm," "pick-up," "put-down," "plug-in," and "plug-out," in printer part assembling task. The 3D trajectory of two hands and two printer parts were extracted using the same Kinect sensor system. Eight (8) sequences were recorded and used with leave-one-out cross-validation. As can be seen from Table 4, embodiments of the present invention with both STM and DBM outperformed other benchmark approaches by a large margin.

TABLE 4

Continuous action recognition for Set II: Assembling

| SLDS | CRF | LDCRF | STM | BDM | STM + DBM |
|---|---|---|---|---|---|
| 68.2% | 77.7% | 88.5% | 88.7% | 69.0% | 92.9% |

3. Additional Comparison

Figure 9:
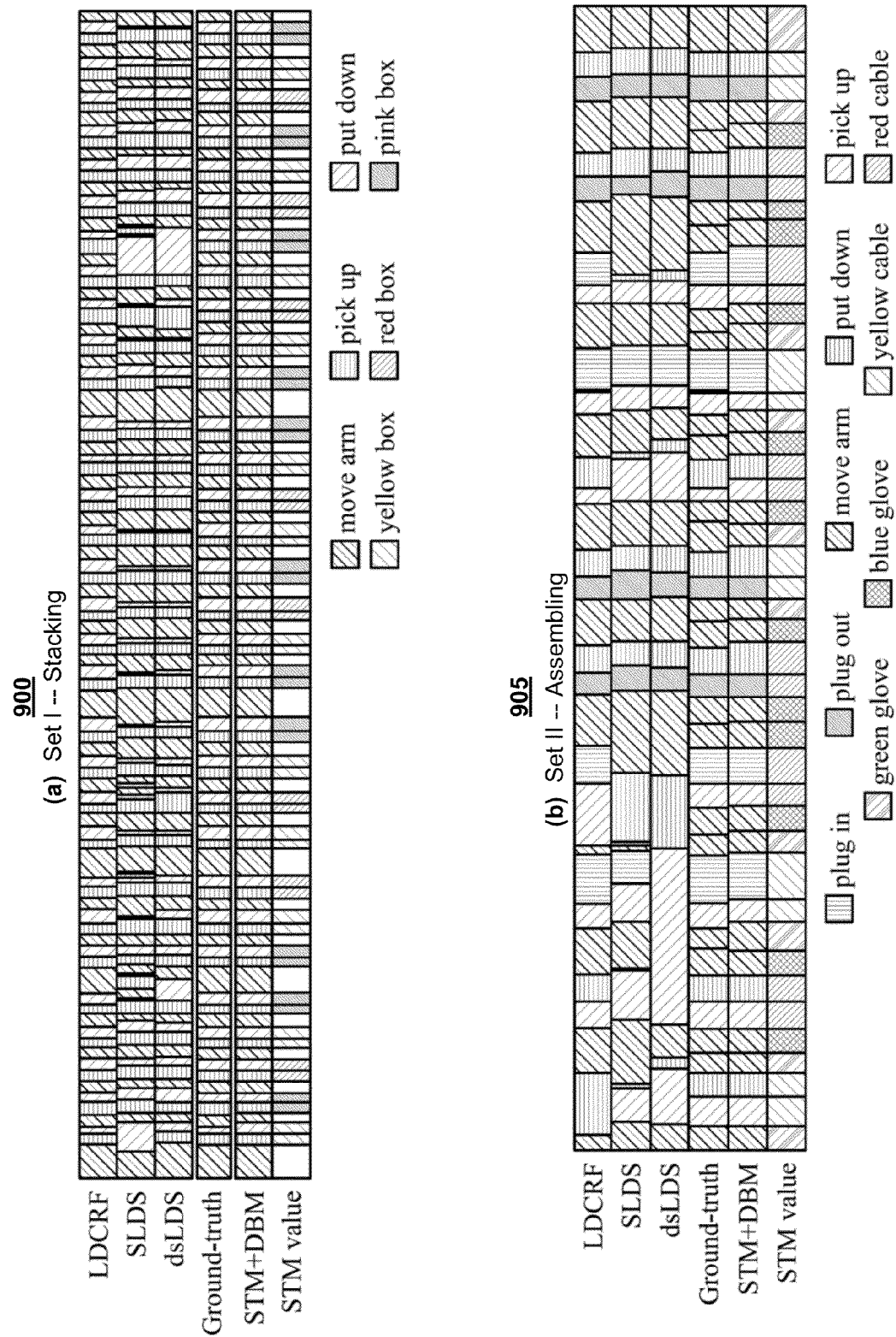
FIG. 9 depicts the results, relative to other methodologies, of continuous action recognition for two datasets according to embodiments of the present invention.

To provide more insightful comparison between embodiments of the present invention and other benchmark algorithms, FIG. 9 shows two examples of continuous action recognition results from the in-house dataset. The results given by SLDS contain short and frequent switching between incorrect action types. This is caused by the false matching of motion patterns to an incorrect action model. Duration SLDS (dSLDS) and LDCRF eliminate the short transitions by considering additional context information; however, their performances degraded severely around noisy or ambiguous action periods (e.g., the beginning of the sequence in FIG. 9(b)) due to false duration prior or overdependence on discriminative classifier. The STM+DBM approach of the present patent document does not suffer from any of these problems, because STM helps to identify all action classes disregarding their variations, and DBM further helps to improve the precision of boundaries with both generative and discriminative duration knowledge. Another interesting finding shown in the last rows of FIG. 9(a) and FIG. 9(b) is that the substructure node $Z_t$ can be interpreted by concrete physical meanings. For all the actions in these experiments, we find different object involved in an action corresponds to a different value of Z that has the highest probability in the inferred values $\hat{Z}_{1:T}$. Therefore, in addition to estimating action class, we can also associate object with the action by majority voting based on $\hat{Z}_{1:T}$. In our experiments, all the inferred object association agree with ground truth.

G. Computing System Implementations

In embodiments, one or more computing system may be configured to perform one or more of the methods, functions, and/or operations presented herein. Systems that implement at least one or more of the methods, functions, and/or operations described herein may comprise an application or applications operating on at least one computing system. The computing system may comprise one or more computers and one or more databases. The computer system may be a single system, a distributed system, a cloud-based computer system, or a combination thereof.

It shall be noted that the present invention may be implemented in any instruction-execution/computing device or system capable of processing data, including, without limitation phones, laptop computers, desktop computers, and servers. The present invention may also be implemented into other computing devices and systems. Furthermore, aspects of the present invention may be implemented in a wide variety of ways including software (including firmware), hardware, or combinations thereof. For example, the functions to practice various aspects of the present invention may be performed by components that are implemented in a wide variety of ways including discrete logic components, one or more application specific integrated circuits (ASICs), and/or program-controlled processors. It shall be noted that the manner in which these items are implemented is not critical to the present invention.

Figure 10:
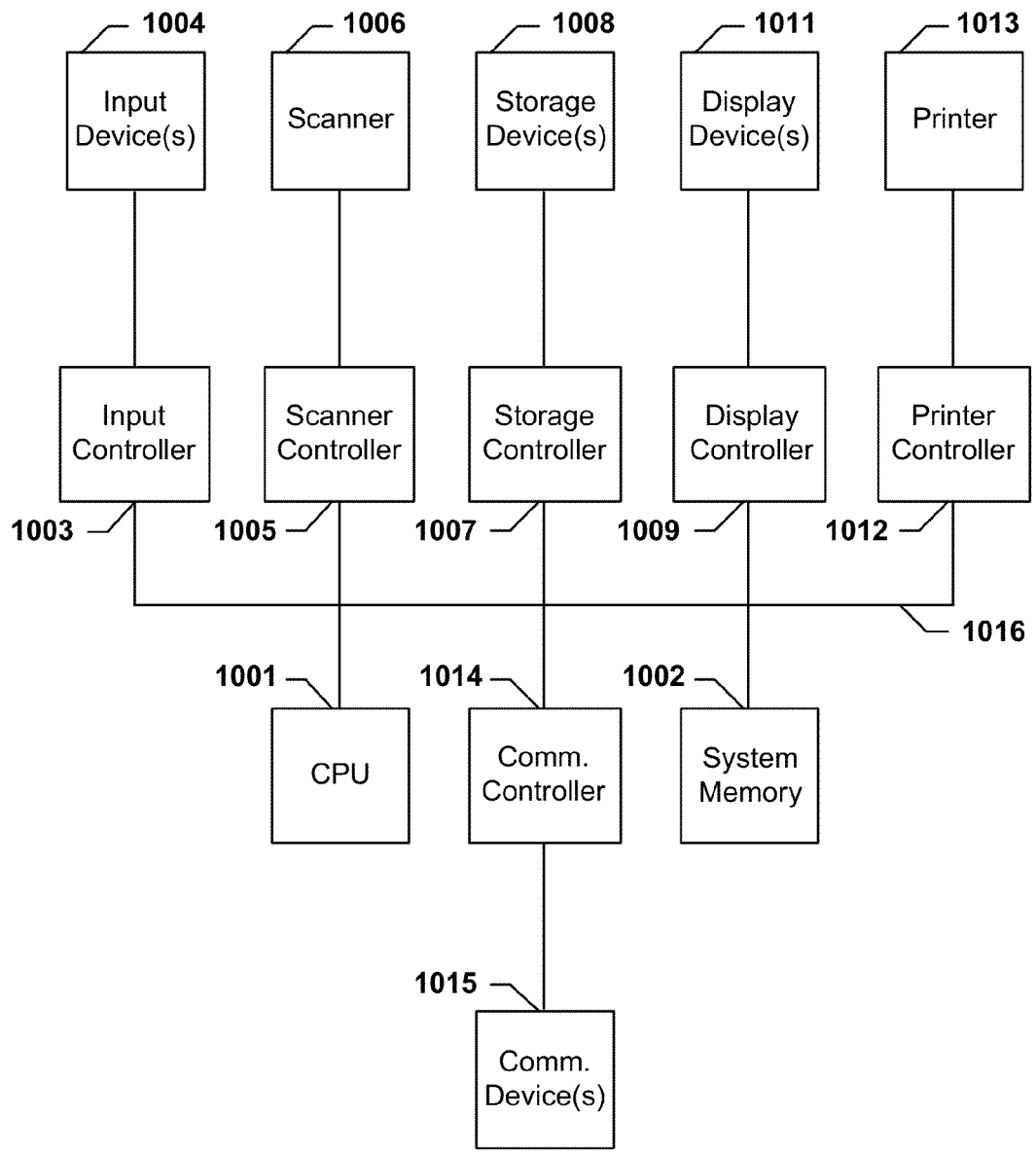
FIG. 10 depicts a block diagram of an example of a computing system according to embodiments of the present invention.

Having described the details of the invention, an exemplary system 1000, which may be used to implement one or more aspects of the present invention, will now be described with reference to FIG. 10. As illustrated in FIG. 10, the system includes a central processing unit (CPU) 1001 that provides computing resources and controls the computer. The CPU 1001 may be implemented with a microprocessor or the like, and may also include a graphics processor and/or a floating point coprocessor for mathematical computations. The system 1000 may also include system memory 1002, which may be in the form of random-access memory (RAM) and read-only memory (ROM).

A number of controllers and peripheral devices may also be provided, as shown in FIG. 10. An input controller 1003 represents an interface to various input device(s) 1004, such as a keyboard, mouse, or stylus. There may also be a scanner controller 1005, which communicates with a scanner 1006. The system 1000 may also include a storage controller 1007 for interfacing with one or more storage devices 1008 each of which includes a storage medium such as magnetic tape or disk, or an optical medium that might be used to record programs of instructions for operating systems, utilities and applications which may include embodiments of programs that implement various aspects of the present invention. Storage device(s) 1008 may also be used to store processed data or data to be processed in accordance with the invention. The system 1000 may also include a display controller 1009 for providing an interface to a display device 1011, which may be a cathode ray tube (CRT), a thin film transistor (TFT) display, or other type of display. The system 1000 may also include a printer controller 1012 for communicating with a printer 1013. A communications controller 1014 may interface with one or more communication devices 1015, which enables the system 1000 to connect to remote devices through any of a variety of networks including the Internet, a local area network (LAN), a wide area network (WAN), or through any suitable electromagnetic carrier signals including infrared signals.

In the illustrated system, all major system components may connect to a bus 1016, which may represent more than one physical bus. However, various system components may or may not be in physical proximity to one another. For example, input data and/or output data may be remotely transmitted from one physical location to another. In addition, programs that implement various aspects of this invention may be accessed from a remote location (e.g., a server) over a network. Such data and/or programs may be conveyed through any of a variety of machine-readable medium including, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices.

Embodiments of the present invention may be encoded upon one or more non-transitory computer-readable media with instructions for one or more processors or processing units to cause steps to be performed. It shall be noted that the one or more non-transitory computer-readable media shall include volatile and non-volatile memory. It shall be noted that alternative implementations are possible, including a hardware implementation or a software/hardware implementation. Hardware-implemented functions may be realized using ASIC(s), programmable arrays, digital signal processing circuitry, or the like. Accordingly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

It shall be noted that embodiments of the present invention may further relate to computer products with a non-transitory, tangible computer-readable medium that have computer code thereon for performing various computer-implemented operations. The media and computer code may be those specially designed and constructed for the purposes of the present invention, or they may be of the kind known or available to those having skill in the relevant arts. Examples of tangible computer-readable media include, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices. Examples of computer code include machine code, such as produced by a compiler, and files containing higher level code that are executed by a computer using an interpreter. Embodiments of the present invention may be implemented in whole or in part as machine-executable instructions that may be in program modules that are executed by a processing device. Examples of program modules include libraries, programs, routines, objects, components, and data structures. In distributed computing environments, program modules may be physically located in settings that are local, remote, or both.

One skilled in the art will recognize no computing system or programming language is critical to the practice of the present invention. One skilled in the art will also recognize that a number of the elements described above may be physically and/or functionally separated into sub-modules or combined together.

It will be appreciated to those skilled in the art that the preceding examples and embodiment are exemplary and not limiting to the scope of the present invention. It is intended that all permutations, enhancements, equivalents, combinations, and improvements thereto that are apparent to those skilled in the art upon a reading of the specification and a study of the drawings are included within the true spirit and scope of the present invention.

What is claimed is:

1. A computer-implemented method for estimating a sequence of action labels given an observation sequence, the method comprising:
   given a linear dynamic system state space model that is capable of being represented as a unified probabilistic graphical model comprising duration-of-actions layer (D) consisting of a series of time duration values, an action label layer (S), a first hidden state layer comprising a latent state layer (X), a second hidden state layer comprising a substructure transition layer (Z), and an observation layer (Y):
   maximizing a joint posterior of action label at each of a set of time instances given a set of observations;
   approximating the joint posterior using sampling, wherein a number of samples are drawn to approximate the posterior; and
   calculating the posterior by weighted combination of the samples;
   wherein determination of a new action label in the action label layer (S) and new substructure transition in the substructure transition layer (Z) are triggered by the ending of a time period defined by a time duration value in the duration-of-action layer (D).

2. The computer-implemented method of claim 1 wherein the step of maximizing a joint posterior of action label at each of a set of time instances given a set of observations comprises:
   maximizing a joint posterior of action label, action boundary, and action unit index at each of a set of time instances given a set of observations.

3. The computer-implemented method of claim 1 wherein the step of approximating the joint posterior using sampling, wherein a number of samples are drawn to approximate the posterior comprises a particle filtering process and the latent state in the particle filtering process is marginalized out by Rao-Blackwellisation, wherein only samples of action label and action unit index need be drawn.

4. The computer-implemented method of claim 1 wherein:
   said latent state layer (X) consists of a series of latent states, each latent state representing an action identifiable by said action labels;
   said substructure transition layer (Z) consists of a series of substructure states, and each action represented by a latent state of the latent, state layer (X) is comprised of a combinational sequence of said substructure states.

5. The computer-implemented method of claim 4 wherein in the action boundary layer (D), the value of a given time duration value is dependent upon the substructure state and the latent state at the end of the time duration specified by the time duration value immediately preceding the given time duration value in the series of time duration values.

6. The computer-implemented method of claim 5 wherein the value of the given time duration is further dependent upon the action label in the action label layer (S) at the end of the time duration specified by the time duration value immediately preceding the given time duration value in the series of time duration values.

7. A computer-implemented method for providing a sequence of action labels given a sequence of observations, the method comprising the following steps:
(i) constructing a state space model having:
   (a) a first hidden state layer comprising a latent state layer (X) consisting of a series of latent states, each latent state representing an action identifiable by said action labels;
   (b) a second hidden state layer comprising a substructure transition layer (Z) consisting of a series of substructure states, wherein each action represented by each latent state of the latent state layer (X) is comprised of a combinational sequence of said substructure states;
   (c) an observation layer (Y) consisting of a said sequence of observations, wherein each observation corresponds to a separate latent state in the latent state layer (X);
   (d) a duration-of-actions layer (D) consisting of a series of time duration values each representing a time duration, wherein each time duration value is dependent upon the substructure state and the latent state at the end of the time duration specified by its immediately previous time duration value in the series of time duration values; and
   (e) an action label layer (S) that provides said sequence of action labels, wherein transition from a first substructure state to its immediate following substructure state in said series of substructure states of the substructure transition layer (Z) is dependent upon the action label that coincides with first substructure state;
(ii) submitting the sequence of observations into the state space model to maximize a joint posterior of action label as define by action label layer (S).

8. The method of claim 7, wherein in step (ii), for each observation $y_{1:T}$ at a time T, the joint posterior of action label is defined from $p(S_{1:T}, D_{1:T}, Z_{1:T}|y_{1:T})$.

9. The method of claim 7, wherein the action label layer (S), determination of a new action label is triggered by the end of a time duration specified by a corresponding time duration value.

10. The method of claim 9, wherein each time duration value is further dependent upon the action label at the end of the time duration specified by its immediately previous time duration value in the series of time duration values.

11. The method of claim 7, wherein state transitions in said substructure transition layer (Z) are triggered by the end of each time duration specified by said series of time duration values.

12. The method of claim 7, wherein:
in said latent state layer (X), the actions represented by the latent states are continuous actions; and
in said substructure transition layer (Z), each substructure state represents a discrete action, and each discrete action is identified as an action primitive; and
each continuous action in said latent layer (X) is associated with a corresponding set of said action primitives, and each continuous action in said latent layer (X) is represented by a sub-set of action primitives selected from its corresponding set of action primitives.

13. The method of claim 12, wherein latent states representing more diverse actions are assigned more action primitives in their corresponding sets of said action primitives than latent states representing less diverse actions.

14. The method of claim 7, wherein:
in said substructure transition layer (Z), each substructure state represents is identified as an action primitive;
in said latent state layer (X), each latent state is divided into a plurality of action stages, and each action stage is comprised of a subset of said action primitives, and for a given latent state a sub-series of substructure state transitions in the substructure transition layer (Z) specify the action primitive transitions that comprise the given latent state;
state transitions in said substructure transition layer (Z) are defined a transition matrix, said transition matrix being a block-wise sparse matrix with each block within the transition matrix being sparse and corresponding to a different action stage within a latent state, the block-wise structure of the transition matrix permitting sequential transitions between the actions stages of a latent state by the arrangement of blocks of cells within the transition matrix, and each block of cells permitting free propagation of action primitives from one to another within an action stage.

* * * * *